H. B. RUDD.
APPARATUS FOR STERILIZING LIQUIDS.
APPLICATION FILED JULY 26, 1920.

1,432,124.

Patented Oct. 17, 1922.
4 SHEETS—SHEET 1.

Inventor:
Harry B. Rudd
By
Attorney.

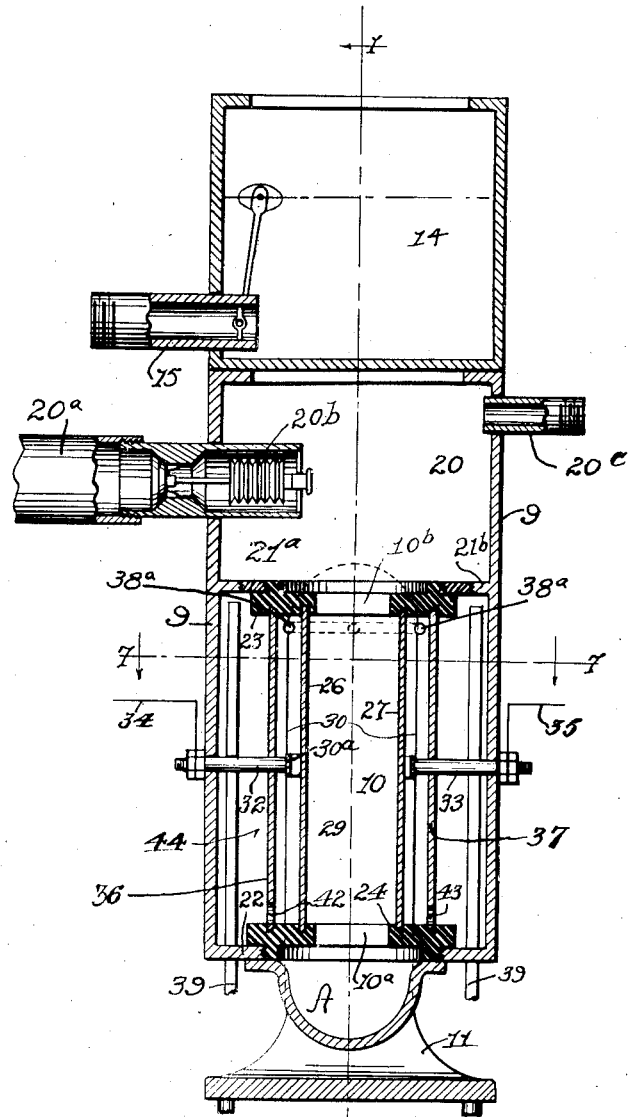

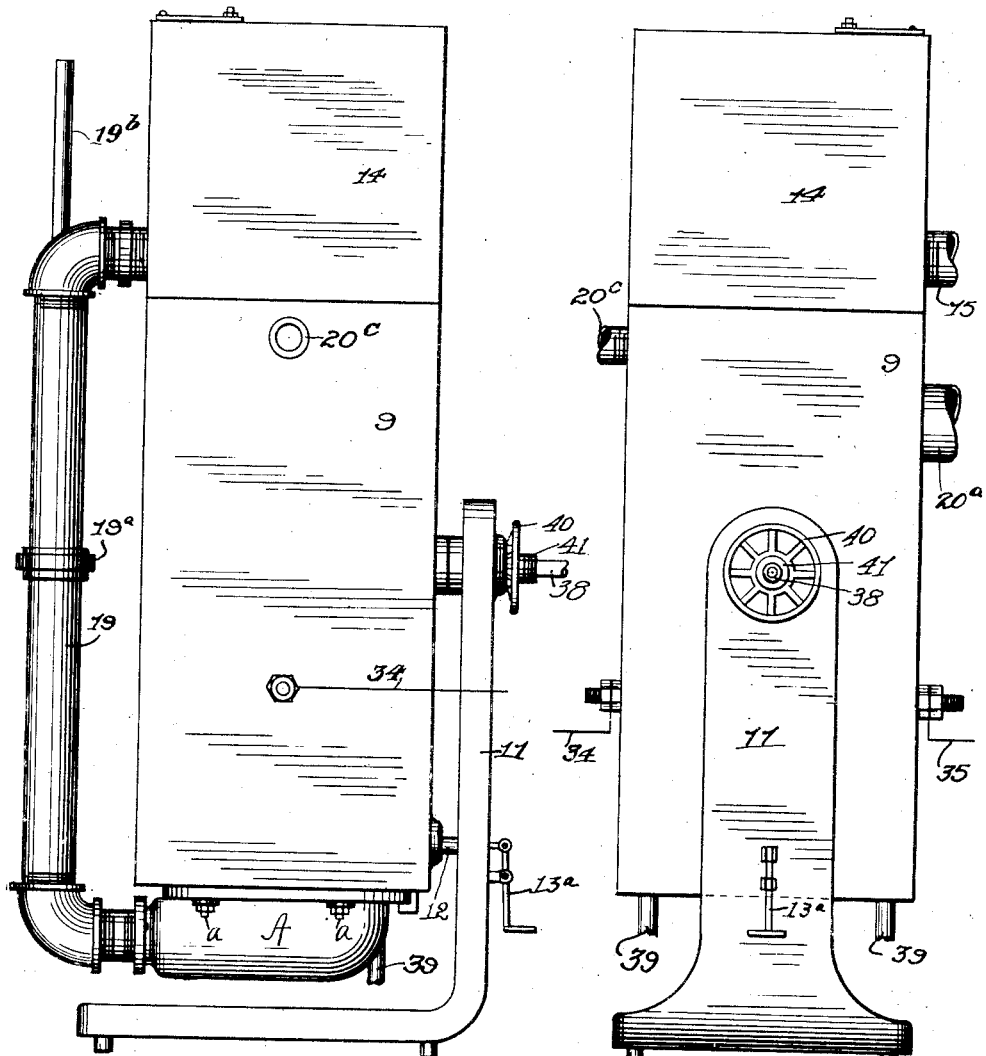

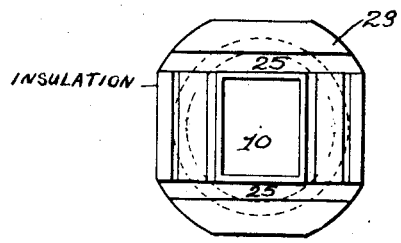
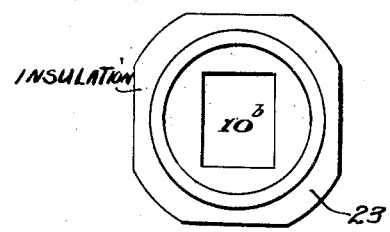
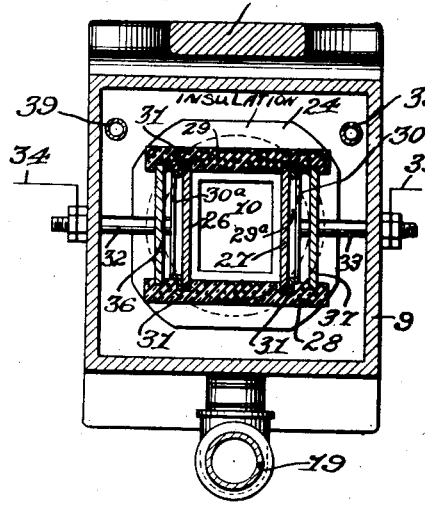
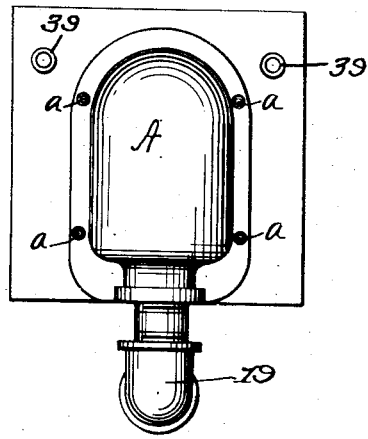
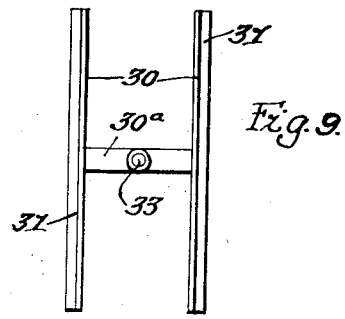

Patented Oct. 17, 1922.

1,432,124

UNITED STATES PATENT OFFICE.

HARRY B. RUDD, OF MANSFIELD, OHIO.

APPARATUS FOR STERILIZING LIQUIDS.

Application filed July 26, 1920. Serial No. 399,037.

*To all whom it may concern:*

Be it known that I, HARRY B. RUDD, a citizen of the United States, residing at Mansfield, Richland County, Ohio, have invented certain new and useful Improvements in Apparatus for Sterilizing Liquids, of which the following taken in connection with the drawings is a description.

My invention relates to apparatus for electrically sterilizing liquids for the purpose of purifying same, and belongs to the class disclosed in my co-pending applications, Serial Nos. 362,927 and 362,928, which is accomplished by destroying or rendering inactive the colonies of bacteria which are always present in liquids and especially numerous in milk, wherein they are propagated rapidly under the conditions surrounding milk in the way it is ordinarily handled.

In the operation of apparatus of this kind great care is necessary to have the liquid being treated and the current applied thereto at all times under absolute control of the operator and the mechanism so regulated that the current reaches every particle of the liquid being treated, and also that the liquid shall be kept in transit at a controlled rate of movement and in exact quantities for proper treatment without being subjected to overheating.

It is more advantageous in apparatus of this character to employ an alternating current of electricity at 220 volts more or less and of sufficient amperage to destroy the bacteria quickly, the action of the electric current leaving the liquid itself in its original state.

In practice I have found it essential to secure the best results also to provide a passageway for the transit of the liquid being treated of such size and construction that a predetermined voltage pressure may be maintained upon the liquid in transit throughout the sterilizing process. In this operation I have also provided means for cooling the electrodes while the apparatus is in operation.

It is an object of this invention to so construct and arrange the operative parts thereof that they are practically automatic in operation, the intake and discharge of the liquid being controlled by temperature responsive mechanism which regulates the degree of heat of the liquid at each step in the operation.

These and other objects of the invention will be apparent to those skilled in the art to which this invention belongs. In the accompanying drawings I have illustrated what I now consider the preferred form of an embodiment of the essential elements of my invention and in these drawings—

Figs. 1 and 2 are respectively vertical sectional views through the casing and sterilizing apparatus of the invention;

Figs. 3 and 4 are respectively front and side elevations thereof;

Fig. 5 is an inside plan view of one of the electrode holders;

Fig. 6 is a plan view of the reverse side of said holder;

Fig. 7 is a sectional detail of the electrodes and the casing containing them taken on line 7—7 of Figure 2.

Fig. 8 is a bottom plan view and,

Fig. 9 is a side elevation of the terminal bar and frame.

Figure 1:
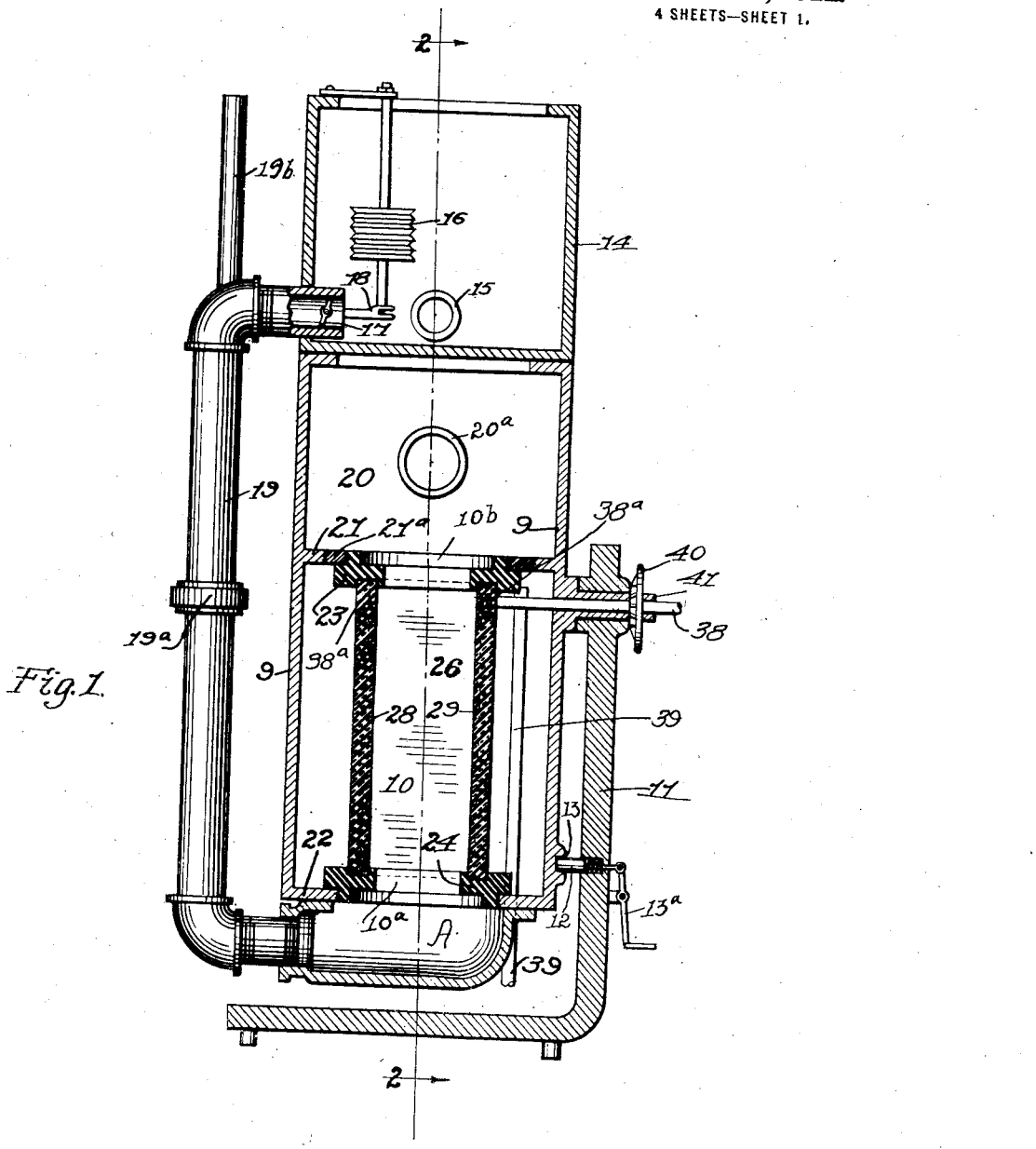

Referring to the drawings 9 is a casing having a sterilizing chamber 10, provided inside thereof. The casing 9 is pivotally or otherwise movably mounted upon a bracket support 11, which may be placed upon the floor, a table or upon any suitable place provided for it. In this instance I have shown a casing for the sterilizing apparatus which is square in cross section, but I contemplate any other shape found more convenient.

For the purpose of enabling the sterilizing chamber to be cleansed and kept in sanitary condition this casing is pivotally supported near the center thereof, upon the bracket support 11, and to hold the same securely in position while in use, a spring latch 12 is provided to engage a socket 13 formed on the outside wall of the casing, thereby preventing any movement of the casing when not desired. A foot lever 13ª has connection with the spring latch 13 whereby it may be easily disengaged and the casing 9 tilted to another position.

14 is a supply tank which for convenience is placed on the top of the casing 9 and may be attached thereto or may be removable therefrom as desired. The liquid being treated, after first being pre-heated is introduced into this tank 14 through the valve controlled supply pipe 15, which, when it rises to the level of the temperature responsive mechanism 16, will automatically act to open the valve 17 by depressing the crank 18. This causes the liquid to be discharged through the pipe 19 into the sterilizing apparatus the pipe 19 being provided with a vent pipe 19$^b$. The pipe 19 is provided with unions 19$^a$, by means of which it may be disconnected when the sterilizing chamber is to be cleaned.

The casing 9 is divided into two chambers; 10 the sterilizing chamber, and 20 the receiving chamber from which the treated liquid is discharged through pipe 20$^a$, the chamber 20 being provided with an overflow pipe 20$^c$. 21 is a circumferential threaded flange formed inside of said casing 9, engaged by a ring 21$^a$, which has a central threaded opening therethrough for a purpose to be presently explained. The bottom of the casing 9 is also formed with a central threaded opening therethrough corresponding in size with the first mentioned opening.

Having engagement with each of said openings is an upper and lower electrode holder 23—24, preferably formed of rubber, which has connection with the ring 21$^a$ (Figs. 1 and 2). Upon the oppositely facing surfaces of these electrode holders are provided grooves 25, within which are held the electrodes 26—27, and the insulating members 28—29, between which is the sterilizing chamber 10 having an intake opening 10$^a$ at the bottom thereof and a discharge opening 10$^b$ at the top thereof. Extending parallel with the electrodes 26—27 are the frames 30 which are preferably of copper, the edges of which are provided with shoulders 31, which engage around the edges of the electrodes fitting into the grooves provided in the upright insulating members 28—29.

32—33 are terminals having connection through the bars 30$^a$ with the connecting frames 30, and electrodes 26—27, and through wires 34—35 with a suitable source of electrical energy.

Fitting also into grooves in the upright insulating members 28—29 are the plates or partitions 36—37 which extend between the upper and lower holding members 23—24 and form cooling chambers between said plates 36—37 and the electrodes 26—27.

Extending through the bracket 11 and through an opening in the casing 9 is a water supply pipe 38 which is provided with discharge openings 38$^a$ near each of the electrodes 26—27.

A hand wheel 40 is mounted on a threaded shank 41 and holds the parts firmly in position. When the apparatus is in use water is constantly supplied to the cooling chamber back of each electrode 26—27 for the purpose of cooling them while the current is passing. Each of the plates 36—37 is provided with an opening 42—43 near the bottom thereof through which the cooling liquid passes to the outer chambers 44, where it discharges through the overflow pipes 39, which maintain the water at the desired level.

In operation the liquid to be treated is first preheated by apparatus not here shown and which forms no part of the present invention, and delivered into the receptacle 14, where its discharge is regulated by the temperature responsive mechanism 16, through the pipe 19 to the basin A of the sterlizing chamber 10, from whence it rises through the opening 10$^a$ into the sterilizing chamber 10 where it is brought into contact with the electrical current flowing through the electrodes 26—27.

The temperature of the liquid in the chamber 10 is raised as the liquid is in transit upwardly through the chamber to the deceptacle 20. The flow of the liquid into and through the sterilizing chamber is so regulated that the rapidity of its passage is predetermined by the temperature and the current supply thereof in order that all of the liquid being treated shall have reached a predetermined temperature before passing from the effect of the current into the chamber 20 from whence it is discharged.

Connected with the discharge pipe 20$^a$ is the temperature responsive mechanism 20$^b$, in the form of a thermodynamic valve which is operated by the liquid in the chamber rising to the height of the valve and causing it to open allowing the treated liquid to discharge through pipe 20$^a$.

When it is desired to close the sterilizing apparatus the pipe 19 is separated at union joint 19$^a$, and the receptacle 14 is removed from the casing 9, when by depression of the foot lever 13$^a$ and loosening of the hand wheel 40 the casing 9 may be turned to a horizontal, or any other position desired for removing any of the parts of the sterilizing apparatus for cleansing or for any other purpose required. The basin A is removably attached to the bottom of the casing 9 preferably by bolts a.

I claim:—

1. An apparatus for sterlizing liquids comprising an outer casing, a sterilizing receptacle therein, said receptacle being angular in cross section, having electrodes forming two sides thereof and having means for connection with a source of electrical energy, and automatically operated mechanism for discharging the liquid at a predetermined temperature.

2. In apparatus for sterilizing liquids comprising an outer casing, a sterilizing receptacle therein, said receptacle being angular in cross section, having electrodes forming opposite sides thereof, said electrodes having means for connection with a source of electrical energy, and means outside of said electrodes for cooling them while the liquid is being sterilized.

3. A receptacle for sterilizing liquids, comprising an outer casing, a sterilizing receptacle therein, said receptacle being angular in cross section, having electrodes forming opposite sides thereof, said electrodes having means for connection with a source of electrical energy, means for cooling the electrodes during the sterilizing operation, and means for automatically discharging the sterilized liquid from the receptacle at a predetermined temperature.

4. An apparatus for sterilizing liquids comprising an outer casing, and a sterilizing receptacle therein said receptacle being angular in cross section having oppositely facing electrodes on two sides thereof, said electrodes having means for connection with a source of electrical energy, and means for automatically controlling the transit of liquid passing through said sterilizing receptacle.

5. An apparatus for sterilizing liquids comprising an outer casing, a sterilizing receptacle therein said receptacle being angular in cross section having electrodes on opposite sides thereof, said electrodes having means for connection with a source of electrical energy, means for regulating the transit of the liquid through the sterilizing receptacle, and means for automatically discharging the treated liquid at a predetermined temperature.

6. An apparatus for sterilizing liquids comprising an outer casing, a sterilizing receptacle therein said receptacle being angular in cross section having electrodes on opposite sides thereof, said electrodes having means for connection with a source of electrical energy, a partition back of each electrode forming cooling chambers therefor, and means for introducing a cooling liquid into and through said cooling chambers during the sterilizing operation.

7. An apparatus for sterilizing liquids, comprising an outer casing, a sterilizing receptacle within said casing but spaced apart therefrom, electrodes forming two sides of said receptacle, insulating members forming two sides of said receptacle, a partition back of each electrode forming cooling chambers therefor, means for introducing a cooling liquid into and through said chambers during the sterilizing operation, and means for automatically regulating the transit of the liquid through the sterilizing receptacle.

8. An apparatus for sterilizing liquids comprising an outer casing, a sterilizing apparatus within said casing and out of electrical contact therewith, electrodes forming opposite sides of said receptacle, insulating members forming opposite sides of said receptacle, means for causing a cooling liquid to flow in contact with the outside of each electrode during the sterilizing operation, and means to regulate the transit of the liquid through the sterilizing apparatus and automatically discharge it therefrom.

9. An apparatus for sterilizing liquids, the combination of an outer casing, a sterilizing receptacle within said casing and out of electrical contact therewith, said receptacle comprising electrodes arranged in opposite sides of the sterilizing chamber, insulating members forming opposite sides of said receptacle between the electrodes, insulating members above and below said electrodes with passageways through said last named insulating members, means for controlling the transit of liquid through said sterilizing chamber and means for cooling the electrodes during the sterilizing operation.

10. In an apparatus for sterilizing liquids, the combination of an outer casing, a sterilizing receptacle within said casing, and out of electrical contact therewith, said receptacle having two sides thereof formed of electrodes, insulating members between said electrodes and insulating members above and below said electrodes with passageways through said last named insulating members, a partition between each electrode and the wall of the outer casing, means for cooling said electrodes during the sterilizing operation by passing the cooling liquid through the insulating members and causing it to flow in contact with the electrodes during the sterilizing operation, means for regulating the transit of the liquid to be treated and means for automatically discharging the treated liquid from the receptacle.

11. In apparatus for sterilizing liquids, the combination of an outer casing, means for movably mounting said casing, a sterilizing receptacle within said casing, a supply receptacle having connection with said sterilizing receptacle, means for disconnecting said supply receptacle and said sterilizing receptacle and changing the position of said casing.

12. In apparatus for sterilizing liquids, the combination of an outer casing, means for pivotally mounting said casing, a sterilizing receptacle within said casing, oppositely facing electrodes in said sterilizing chamber and means for cooling said electrodes during the sterilizing operation.

13. In apparatus for sterilizing liquids, the combination of an outer casing movably mounted, a sterilizing receptacle within said casing, electrodes forming opposite walls in said receptacle, means for cooling said electrodes during the sterilizing operation, and means for controlling the maximum and minimum temperatures of the liquid being treated.

14. In apparatus for sterilizing liquids, the combination of a casing pivotally mounted, means for locking said casing in fixed position, a sterilizing receptacle within said casing, electrodes and means for cooling them during the sterilizing operation, and means for automatically discharging the treated liquid at a predetermined temperature.

15. In apparatus for sterilizing liquids, the combination of a casing, a sterilizing receptacle within said casing said receptacle being angular in cross section, electrodes forming opposite sides of the sterilizing receptacle and having means for connection with a source of electrical energy, and means for cooling said electrodes during the sterilizing operation.

16. In apparatus for sterilizing liquids, the combination of a casing, a sterilizing receptacle within said casing, but out of electrical contact therewith, electrodes forming opposite sides of the sterilizing repectacle and having means for connection with a source of electrical energy, insulating members between said electrodes and insulating members above and below said electrodes, and thermodynamic valves controlling the supply and discharge of the liquid to be treated.

17. In apparatus for sterilizing liquids, the combination of a casing, a sterilizing receptacle within said casing but out of electrical contact therewith, electrodes forming opposite sides of the sterilizing receptacle and having means for connection with a source of electrical energy, insulating members between said electrodes, and insulating members above and below said electrodes, thermodynamic valves controlling the supply and discharge of the liquid being treated, and means for regulating the supply of liquid to the sterilizing receptacle.

18. In a sterilizing apparatus, the combination of a casing, a sterilizing receptacle in said casing, said receptacle being angular in cross section, electrodes forming opposite sides of said receptacle and insulating members forming opposite sides of said members, means for regulating the transit of liquids through said sterilizing receptacle, and means for cooling the liquid during the sterilizing operation.

In testimony whereof I have signed this specification.

HARRY B. RUDD.